(12) United States Patent
Jan et al.

(10) Patent No.: US 10,662,073 B2
(45) Date of Patent: May 26, 2020

(54) ZINC OXIDE NANOCAPSULE AND MANUFACTURING METHOD THEREOF

(71) Applicant: Institute of Nuclear Energy Research, Atomic Energy Council, Executive Yuan, R.O.C, Taoyuan (TW)

(72) Inventors: Der-Jun Jan, Taoyuan (TW); Shih-Shou Lo, Taoyuan (TW); Wan-Hsuan Tsai, Taoyuan (TW)

(73) Assignee: INSTITUTE OF NUCLEAR ENERGY RESEARCH, ATOMIC ENERGY COUNCIL, EXECUTIVE YUAN, R.O.C, Taoyuan (TW)

( * ) Notice: Subject to any disclaimer, the term of this patent is extended or adjusted under 35 U.S.C. 154(b) by 211 days.

(21) Appl. No.: 15/869,409

(22) Filed: Jan. 12, 2018

(65) Prior Publication Data
US 2019/0119123 A1   Apr. 25, 2019

(30) Foreign Application Priority Data
Oct. 20, 2017   (TW) .............................. 106136215 A

(51) Int. Cl.
C01G 9/02   (2006.01)
B01J 13/04   (2006.01)
C09K 11/02   (2006.01)
B01J 13/02   (2006.01)

(52) U.S. Cl.
CPC ................ *C01G 9/02* (2013.01); *B01J 13/02* (2013.01); *B01J 13/04* (2013.01); *C09K 11/025* (2013.01); *C01P 2004/03* (2013.01); *C01P 2004/13* (2013.01); *C01P 2004/16* (2013.01); *C01P 2004/30* (2013.01)

(58) Field of Classification Search
None
See application file for complete search history.

(56) References Cited

U.S. PATENT DOCUMENTS

2010/0054988 A1*  3/2010  Lee .................. A61L 2/0052
                                                  422/4

* cited by examiner

*Primary Examiner* — Jeffrey D Washville
(74) *Attorney, Agent, or Firm* — Locke Lord LLP; Tim Tingkang Xia, Esq.

(57) ABSTRACT

A method for manufacturing a Zinc oxide nanocapsule includes: a step of preparing a Zinc oxide narorod; a step of etching the Zinc oxide narorod to form a Zinc oxide nanotube, wherein the Zinc oxide nanotube is a hollow tubular structure; a step of filling a material into the Zinc oxide nanotube; and, a step of regrowing the Zinc oxide nanotube to encapsulate the hollow tubular structure so as to form a Zinc oxide nanocapsule. In addition, a zinc oxide nanocapsule is also provided.

6 Claims, 5 Drawing Sheets

S100

S110 — Prepare a Zinc oxide narorod

S120 — Etch the Zinc oxide narorod to form a Zinc oxide nanotube

S130 — Fill a material into the Zinc oxide nanotube

S140 — Regrow the Zinc oxide nanotube to encapsulate the hollow tubular structure so as to form a Zinc oxide nanocapsule

FIG. 1

ZINC OXIDE NANOCAPSULE AND MANUFACTURING METHOD THEREOF

CROSS REFERENCE TO RELATED APPLICATION

This application claims the benefit of Taiwan Patent Application Serial No. 106136215, filed Oct. 20, 2017, the subject matter of which is incorporated herein by reference.

BACKGROUND OF THE INVENTION

(1) Field of the Invention

The invention relates to a nanocapsule, and more particularly to a Zinc oxide nanocapsule and a method for manufacturing the Zinc oxide nanocapsule.

(2) Description of the Prior Art

Recently, organic/inorganic mixed films have been successfully introduced to the marketplace. The majority of these organic/inorganic mixed films are prepared by a layered piling process. Such a manufacturing process does have a shortcoming in failing to reduce the volume effectively. Also, this manufacturing process can provide encapsulation to the microstructure of the film, and thus little protection can be only provided from exterior invasions. For example, if the material of the aforesaid film is contaminated by water or oxygen, its properties would be altered, usually in a worse direction. Thereupon, the original properties of the film as well as the design purposes to serve would be gradually lost.

Hence, A topic of providing a Zinc oxide nanocapsule and a method for manufacturing the Zinc oxide nanocapsule that can effectively overcome the aforesaid shortcomings is definitely urgent to the skill in the art.

SUMMARY OF THE INVENTION

Accordingly, it is an object of the present invention to provide a Zinc oxide nanocapsule and a method for manufacturing the Zinc oxide nanocapsule, where the Zinc oxide nanocapsule can be produced from regrowing a Zinc oxide nanotube, and a material can be encapsulated and thus well protected inside the Zinc oxide nanocapsule.

In one aspect of the present invention, the method for manufacturing a Zinc oxide nanocapsule includes: a step of preparing a Zinc oxide narorod; a step of etching the Zinc oxide narorod to form a Zinc oxide nanotube, wherein the Zinc oxide nanotube is a hollow tubular structure; a step of filling a material into the Zinc oxide nanotube; and, a step of regrowing the Zinc oxide nanotube to encapsulate the hollow tubular structure so as to form a Zinc oxide nanocapsule.

In another aspect of the present invention, the Zinc oxide nanocapsule includes a Zinc oxide nanotube, a material and a Zinc oxide nanostructure. The Zinc oxide nanotube is formed as a hollow tubular structure. The material is filled into the hollow tubular structure. The Zinc oxide nanostructure is formed by regrowing the Zinc oxide nanotube so as to encapsulate the hollow tubular structure for forming the Zinc oxide nanocapsule.

In one embodiment of the present invention, the material is one of a luminescent material, a solar cell material and a biomedical material.

In one embodiment of the present invention, the step of preparing the Zinc oxide narorod includes a step of preparing a ZnO crystal seed solution and coating the ZnO crystal seed solution onto a substrate so as to form a ZnO crystal seed layer, and a step of placing the ZnO crystal seed layer into a first growth liquid and performing a heating process so as to grow the ZnO crystal seed layer into the Zinc oxide narorod.

In one embodiment of the present invention, the first growth liquid is prepared by mixing a Zinc nitrate, a hexamethy lenetetramie (HMT) and a deionized water.

In one embodiment of the present invention, the step of preparing the ZnO crystal seed solution includes: a step of mixing a Zinc acetate, a diethylene glycol and a water to form a mixture, stirring and heating the mixture so as to form a base solution; and, a step of processing the base solution in a centrifugal manner so as to provide an upper portion thereof to be sucked away as a suspension solution, wherein the suspension solution is the ZnO crystal seed solution.

In one embodiment of the present invention, the step of etching the Zinc oxide narorod includes a step of placing the Zinc oxide narorod into a KCl solution, and a step of heating the KCl solution to etch the Zinc oxide narorod.

In one embodiment of the present invention, the step of regrowing the Zinc oxide nanotube includes a step of placing the Zinc oxide nanotube into a second growth solution and converting the hollow tubular structure by heating into an encapsulated pillar structure for forming the Zinc oxide nanocapsule.

In one embodiment of the present invention, the second growth solution is prepared by mixing a Zinc nitrate, a hexamethy lenetetramie (HMT) and a deionized water.

As described above, in the Zinc oxide nanocapsule and a method for manufacturing the Zinc oxide nanocapsule provided by the present invention, the non-toxic, non-polluting, low-cost and abundant Zinc oxide is implemented to produce the Zinc oxide nanotube for containing thereinside the luminescent material, the solar cell material or the biomedical material, and further a regrowing process is performed to encapsulate the material inside the Zinc oxide nanocapsule. Upon such an arrangement, the contained luminescent material, solar cell material or biomedical material can be prevented and thus protected from moistures and oxygens in the atmosphere. Thereupon, properties of the contained material such as the luminescent material, the solar cell material or the biomedical material can be well preserved in the industry of optoelectronics, energy and biomedicine.

All these objects are achieved by the Zinc oxide nanocapsule and the method for manufacturing the Zinc oxide nanocapsule described below.

BRIEF DESCRIPTION OF THE DRAWINGS

The present invention will now be specified with reference to its preferred embodiment illustrated in the drawings, in which:

FIG. 1 is a schematic flowchart of a preferred method for manufacturing a Zinc oxide nanocapsule in accordance with the present invention;

DESCRIPTION OF THE PREFERRED EMBODIMENT

The invention disclosed herein is directed to a Zinc oxide nanocapsule and a method for manufacturing the Zinc oxide nanocapsule. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 2A:
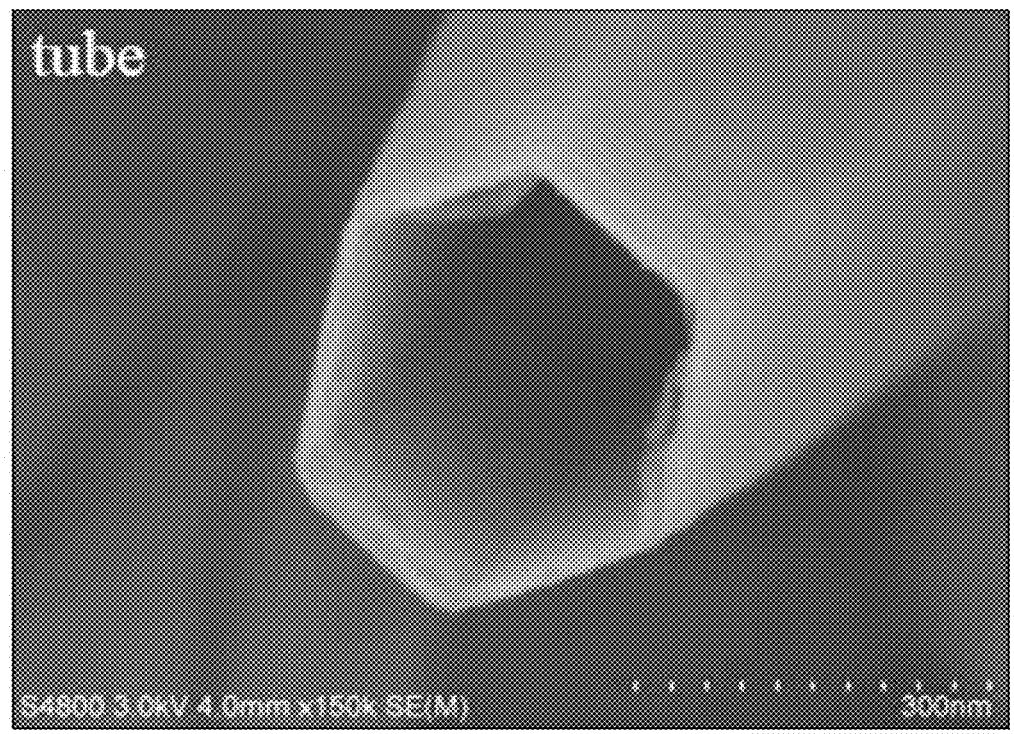
FIG. 2A demonstrates an SEM photo that shows a Zinc oxide nanotube in accordance with the present invention.
Figure 2B:
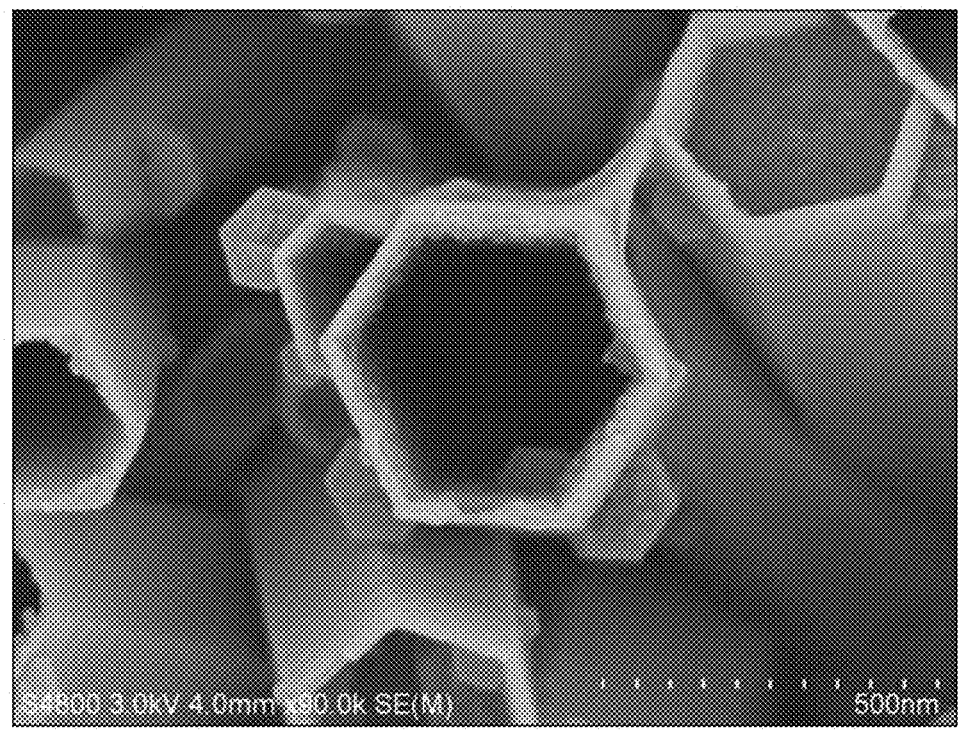
FIG. 2B demonstrates an SEM photo showing that the Zinc oxide nanotube is regrown in accordance with the present invention.
Figure 2C:
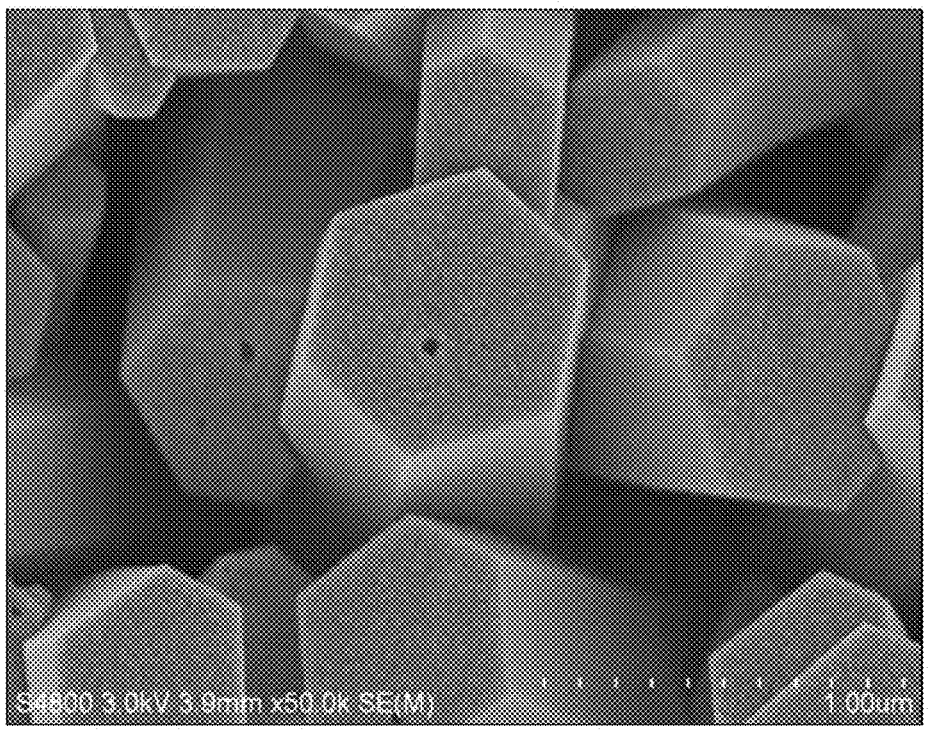
FIG. 2C demonstrates an SEM photo that shows a Zinc oxide nanocapsule in accordance with the present invention.

Refer now to FIG. 1 through FIG. 2C; where FIG. 1 is a schematic flowchart of a preferred method for manufacturing a Zinc oxide nanocapsule in accordance with the present invention, FIG. 2A demonstrates an SEM photo that shows a Zinc oxide nanotube in accordance with the present invention, FIG. 2B demonstrates an SEM photo showing that the Zinc oxide nanotube is regrown in accordance with the present invention, and FIG. 2C demonstrates an SEM photo that shows a Zinc oxide nanocapsule in accordance with the present invention. As shown in FIG. 1, in this embodiment, the method for manufacturing Zinc oxide nanocapsule S100 includes Step S110~Step S140 as follows.

In Step S110, a Zinc oxide narorod is prepared. The step of preparing the Zinc oxide narorod can be performed by the following procedures. Firstly, a ZnO crystal seed solution is prepared. In details, a mixture is obtained by mixing a Zinc acetate, a diethylene glycol and a water. The mixture is then stirred and heated to form a base solution. The base solution is further processed in a centrifugal manner so as to provide an upper portion to be sucked away as a suspension solution. In this embodiment, the suspension solution is a ZnO crystal seed solution, and the base solution is processed by a centrifugal machine.

After the ZnO crystal seed solution is prepared, then the ZnO crystal seed solution is used to coat a substrate so as to form a ZnO crystal seed layer. In the present invention, the substrate can be a glass substrate or a substrate made of a quartz material, an a-Silicon material, a poly-Silicon material or a sapphire material. Then, the ZnO crystal seed layer is placed into a first growth liquid so as to grow the ZnO crystal seed layer into Zinc oxide narorods. In this embodiment, the first growth liquid is prepared by mixing a Zinc nitrate, a hexamethy lenetetramie (HMT) and a deionized water. In addition, in the step of growing the ZnO crystal seed layer into the Zinc oxide narorods, the ZnO crystal seed layer and the growth liquid are both placed into an oven for undergoing a heating process. Till a growth time is over, a deionized water is used to clean the Zinc oxide narorods.

After the Zinc oxide narorods are prepared in Step S110, then Step S120 is perform to etch the Zinc oxide narorods so as to form Zinc oxide nanotubes, in which the Zinc oxide nanotube is formed as a hollow tubular structure. In details, the Zinc oxide narorods are firstly placed into a KCl solution, then the combination is moved into a preheated oven for heating the KCl solution, so that the Zinc oxide narorods can undergo an etching reaction. After the etching reaction is over, the deionized water is used to perform the cleaning so as to obtain a Zinc oxide nanotube having a hollow tubular structure as shown in FIG. 2A.

After the Zinc oxide nanotubes are formed in Step S120, Step S130 is performed to fill a material into each of the Zinc oxide nanotubes. In the present invention, the material can be a luminescent material, a solar cell material or a biomedical material.

Then, in Step S140, each of the Zinc oxide nanotubes with individual materials inside is encapsulated to be a corresponding hollow tubular structure so as for forming a Zinc oxide nanocapsule. In details, the Zinc oxide nanotube (thereafter, single form is applied to simplify the explanation of the present invention) is placed into a second growth solution, where the second growth solution is composed of a Zinc nitrate, a hexamethy lenetetramie (HMT) and a deionized water. Then, a heating process is performed to convert the hollow tubular structure into a corresponding encapsulated pillar structure; i.e., to form the Zinc oxide nanocapsule. In addition, refer now to FIG. 2B and FIG. 2C; where FIG. 2B is an SEM plot after the Zinc oxide nanotube is regrown for 1.5 hours, and FIG. 2C is an SEM plot after the Zinc oxide nanotube is regrown for 3 hours upon when the Zinc oxide nanocapsule is already formed. In other words, through different regrowth times, the degree of encapsulation for the material inside the Zinc oxide nanocapsule can be controlled. Obviously, different degrees of encapsulation for the material inside the Zinc oxide nanocapsule would provide different material properties.

Figure 3:
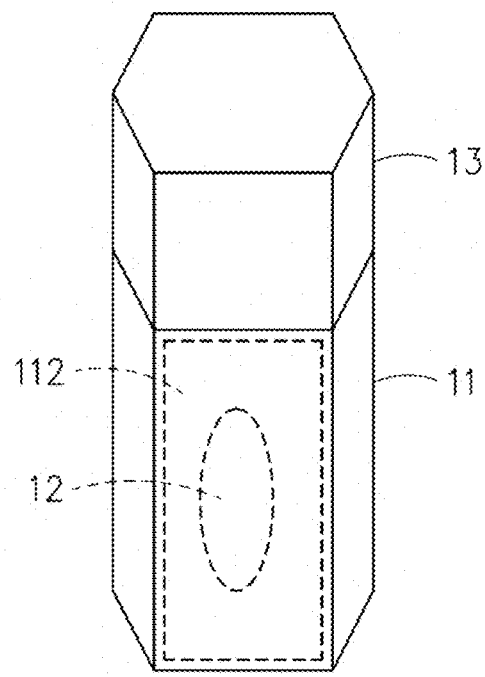
FIG. 3 is a schematic view of the Zinc oxide nanocapsule in accordance with the present invention.

Referring now to FIG. 3, a schematic view of the Zinc oxide nanocapsule in accordance with the present invention is shown. The Zinc oxide nanocapsule 10 includes a Zinc oxide nanotube 11, a material 12 and a Zinc oxide nanostructure 13. The Zinc oxide nanotube 11 is a hollow tubular structure 112 to be filled thereinside by the material 12. The Zinc oxide nanostructure 13 is regrown from the Zinc oxide nanotube 11. Namely, the Zinc oxide nanostructure 13 is regrown from an ens opening of the hollow tubular structure 112, such that the hollow tubular structure 112 can be encapsulated so as to form the encapsulated pillar capsule structure, i.e., to form a Zinc oxide nanocapsule 10.

In summary, in the Zinc oxide nanocapsule and a method for manufacturing the Zinc oxide nanocapsule provided by the present invention, the non-toxic, non-polluting, low-cost and abundant Zinc oxide is implemented to produce the Zinc oxide nanotube for containing thereinside the luminescent material, the solar cell material or the biomedical material, and further a regrowing process is performed to encapsulate the material inside the Zinc oxide nanocapsule. Upon such an arrangement, the contained luminescent material, solar cell material or biomedical material can be prevented and thus protected from moistures and oxygens in the atmosphere. Thereupon, properties of the contained material such as the luminescent material, the solar cell material or the biomedical material can be well preserved in the industry of optoelectronics, energy and biomedicine.

While the present invention has been particularly shown and described with reference to a preferred embodiment, it will be understood by those skilled in the art that various changes in form and detail may be without departing from the spirit and scope of the present invention.

What is claimed is:

1. A method for manufacturing a Zinc oxide nanocapsule, comprising the steps of:
   preparing a Zinc oxide narorod;
   etching the Zinc oxide narorod to form a Zinc oxide nanotube, wherein the Zinc oxide nanotube is a hollow tubular structure;
   filling a material into the Zinc oxide nanotube; and
   regrowing the Zinc oxide nanotube to encapsulate the hollow tubular structure so as to form a Zinc oxide nanocapsule;

wherein the step of preparing the Zinc oxide narorod includes the steps of:
  preparing a ZnO crystal seed solution and coating the ZnO crystal seed solution onto a substrate so as to form a ZnO crystal seed layer; and
  placing the ZnO crystal seed layer into a first growth liquid and performing a heating process so as to grow the ZnO crystal seed layer into the Zinc oxide narorod;
wherein the first growth liquid is prepared by mixing a Zinc nitrate, a hexamethy lenetetramie (HMT) and a deionized water.

2. The method for manufacturing a Zinc oxide nanocapsule of claim 1, wherein the step of preparing the ZnO crystal seed solution includes the steps of:
  mixing a Zinc acetate, a diethylene glycol and a water to form a mixture, stirring and heating the mixture so as to form a base solution; and
  processing the base solution in a centrifugal manner so as to provide an upper portion thereof to be sucked away as a suspension solution, wherein the suspension solution is the ZnO crystal seed solution.

3. The method for manufacturing a Zinc oxide nanocapsule of claim 1, wherein the step of etching the Zinc oxide narorod includes the steps of:
  placing the Zinc oxide narorod into a KCl solution; and
  heating the KCl solution to etch the Zinc oxide narorod.

4. The method for manufacturing a Zinc oxide nanocapsule of claim 1, wherein the step of regrowing the Zinc oxide nanotube includes a step of placing the Zinc oxide nanotube into a second growth solution and converting the hollow tubular structure by heating into an encapsulated pillar structure for forming the Zinc oxide nanocapsule.

5. The method for manufacturing a Zinc oxide nanocapsule of claim 4, wherein the second growth solution is prepared by mixing a Zinc nitrate, a hexamethy lenetetramie (HMT) and a deionized water.

6. The method for manufacturing a Zinc oxide nanocapsule of claim 1, wherein the material is one of a luminescent material, a solar cell material and a biomedical material.

* * * * *